US009650299B2

(12) United States Patent
Alwattari et al.

(10) Patent No.: US 9,650,299 B2
(45) Date of Patent: May 16, 2017

(54) METHODS OF USING DOWNHOLE COMPOSITIONS INCLUDING AN ION-SEQUESTERING COMPOUND

(71) Applicant: Halliburton Energy Services, Inc., Houston, TX (US)

(72) Inventors: Ali Alwattari, Humble, TX (US); Dipti Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 213 days.

(21) Appl. No.: 13/929,848

(22) Filed: Jun. 28, 2013

(65) Prior Publication Data

US 2015/0005204 A1    Jan. 1, 2015

(51) Int. Cl.

| | |
|---|---|
| *C09K 8/035* | (2006.01) |
| *C04B 28/02* | (2006.01) |
| *C09K 8/40* | (2006.01) |
| *C09K 8/42* | (2006.01) |
| *C09K 8/52* | (2006.01) |
| *C09K 8/64* | (2006.01) |
| *C09K 8/68* | (2006.01) |
| *C09K 8/72* | (2006.01) |
| *C09K 8/82* | (2006.01) |
| *C09K 8/88* | (2006.01) |
| *C04B 28/04* | (2006.01) |
| *C09K 8/467* | (2006.01) |

(52) U.S. Cl.
CPC .............. *C04B 28/02* (2013.01); *C04B 28/04* (2013.01); *C09K 8/035* (2013.01); *C09K 8/40* (2013.01); *C09K 8/42* (2013.01); *C09K 8/467* (2013.01); *C09K 8/52* (2013.01); *C09K 8/64* (2013.01); *C09K 8/685* (2013.01); *C09K 8/725* (2013.01); *C09K 8/82* (2013.01); *C09K 8/887* (2013.01)

(58) Field of Classification Search
CPC  C09K 8/035; C09K 2208/28; C09K 2208/34; C09K 8/40; C09K 2211/1029; C09K 8/08; C09K 8/42; C09K 8/46; C09K 8/467; C09K 8/48; C09K 8/52; C09K 8/64; C09K 8/685; C09K 8/725; C09K 8/82; E21B 33/06; E21B 33/064; E21B 33/124; E21B 33/128; E21B 33/1285; E21B 33/138; E21B 33/14; E21B 34/04; E21B 34/063; E21B 34/10; E21B 34/12; E21B 36/008; E21B 36/04; E21B 37/00; E21B 3/00; E21B 23/04; E21B 25/16; E21B 27/02; E21B 31/06; E21B 31/113; E21B 33/0355; E21B 33/037; E21B 33/038; E21B 33/04; E21B 33/068; E21B 33/08; E21B 33/1204; E21B 33/1216; E21B 33/126

See application file for complete search history.

(56) References Cited

U.S. PATENT DOCUMENTS

| | | | | |
|---|---|---|---|---|
| 3,878,895 | A * | 4/1975 | Wieland ................. | E21B 33/16 166/291 |
| 4,083,407 | A * | 4/1978 | Griffin, Jr. ............... | C09K 8/40 106/618 |
| 2010/0311623 | A1* | 12/2010 | Rey ......................... | C09K 8/68 507/259 |
| 2011/0120711 | A1* | 5/2011 | James ...................... | C04B 28/18 166/275 |
| 2012/0187049 | A1* | 7/2012 | Nguyen ................. | C10G 29/20 210/749 |

FOREIGN PATENT DOCUMENTS

EP    0969081 B1    10/2003

OTHER PUBLICATIONS

Urban, D. G., "", In: How to Formulate & Compound Industrial Detergents, (2002), 9, 68-69, 71, 92, 115, 119, 159, 162, 172, 184, and 189.

Kupferman, Eugene, et al., "Postharvest Applied Chemicals to Pears: A Survey of Pear Packers in Washington, Oregon, and California", [online]. [archived on Feb. 7, 2012]. Retrieved from the Internet: <URL: https://web.archive.org/web/20120207035137/ http://postharvest.tfrec.wsu.edu/pages/J9I1A>, (Jun. 1998), 24 pgs.

* cited by examiner

*Primary Examiner* — Kumar R Bhushan
(74) *Attorney, Agent, or Firm* — Chamberlain Hrdlicka

(57) ABSTRACT

The present invention relates to methods and compositions for the treatment of subterranean formations. In various embodiments, the method includes obtaining or providing a composition including at least one-ion sequestering compound, sequestering at least one ion from a polymer in the composition with the at least one ion-sequestering compound, and contacting a subterranean material downhole with the composition.

18 Claims, 4 Drawing Sheets

METHODS OF USING DOWNHOLE COMPOSITIONS INCLUDING AN ION-SEQUESTERING COMPOUND

BACKGROUND OF THE INVENTION

During the drilling, completion, and production phases of wells for petroleum or water extraction, the downhole use of compositions having high viscosities is important for a wide variety of purposes. Higher viscosity fluids can more effectively carry materials to a desired location downhole, such as proppants. Similarly, higher viscosity drilling fluids can more effectively carry materials away from a drilling location downhole. The use of higher viscosity fluids during hydraulic fracturing generally results in larger more dominant fractures.

One common way to increase the viscosity of drilling fluids is to use a mixture of water and a viscosifying polymer, such as guar gum. However, the presence of certain ions in water can limit, reduce, or degrade the viscosity of certain polymers. This limits the use of certain ion-containing water, such as sea water, or water recovered from or naturally produced by some subterranean formations. As a result, the oil and gas industry spends substantial amounts of money and energy to obtain fresh water used for drilling fluid applications, such as for fracturing fluid, or avoids formations having substantial concentrations of particular ions which shrinks the value and size of the market and number of customers fracturing services can be provided.

SUMMARY OF THE INVENTION

In various embodiments, the present invention provides a method of treating a subterranean formation. The method can include obtaining or providing a composition. The composition includes at least one polymer, at least one ion, and at least one ion-sequestering compound. The method includes sequestering the ion from the polymer with the ion-sequestering compound. The method also includes contacting a subterranean material downhole with the composition.

In various embodiments, the present invention provides a method of treating a subterranean formation. The method includes obtaining or providing a composition that includes guar gum or a guar gum derivative. The composition includes at least one $Fe^{2+}$ or $Fe^{3+}$ ion. The composition also includes sodium silicate or sodium metasilicate. The method includes sequestering the ion from the polymer with the ion-sequestering compound. The method also includes contacting a subterranean material downhole with the composition.

In various embodiments, the present invention provides a method of fracturing a subterranean material. The method includes obtaining or providing a composition including guar gum or a guar gum derivative. The composition includes at least one $Fe^{2+}$ or $Fe^{3+}$ ion. The composition also includes sodium silicate or sodium metasilicate. The method includes sequestering the ion from the polymer with the ion-sequestering compound. The method also includes fracturing a subterranean material downhole with the composition to form at least one subterranean fracture.

In various embodiments, the present invention provides a composition for treatment of a subterranean formation. The composition includes at least one polymer. The composition includes at least one ion. The composition also includes at least one ion-sequestering compound. In some embodiments, the composition can further include a downhole fluid.

In some embodiments, the composition can be a composition for fracturing of a subterranean material.

In various embodiments, the present invention provides a composition for treatment of a subterranean formation. The composition includes guar gum or a guar gum derivative. The composition includes at least one $Fe^{2+}$ or $Fe^{3+}$ ion. The composition also includes sodium silicate or sodium metasilicate.

In various embodiments, the present invention provides a method of preparing a composition for treatment of a subterranean formation. The method includes forming a composition including at least one polymer, at least one ion, and at least one ion-sequestering compound.

Various embodiments of the present invention provide advantages over other methods and compositions for use downhole, at least some of which are unexpected. For example, many conventional methods and compositions suffer ill-effects when used with water having certain ions present at particular concentrations, for example a decrease in the degree of hydration or hydratability, a decrease in the degree of crosslinking or crosslinkability, a decrease in viscosity, or gel contraction. For example, many conventional methods and compositions suffer negative effects when used with water having certain amounts of iron ions present. In some embodiments, the methods and compositions of the present invention can be used with water having ions dissolved therein and can suffer less or no negative effects from the ions, as compared to conventional methods and compositions for downhole use, such as at least one of less or no decrease in degree of hydration or hydratability, less or no decrease in degree of crosslinking or crosslinkability, less or no decrease in viscosity, and less or no increase in gel contraction.

In some embodiments, the methods and compositions of the present invention can be used with water having a greater concentration of particular ions dissolved therein and can suffer less or no negative effects from the ions as compared to conventional methods and compositions. In some embodiments, the methods and compositions of the present invention can be used with water having iron ions dissolved therein or a greater concentration of iron ions dissolved therein, and can suffer less or no negative effects from the ions, as compared to conventional methods and compositions. In some embodiments, the method or composition including one or more ion-sequestering agents can protect a wider range of polymers from negative effects of particular ions than other methods and compositions for treating a subterranean formation. In some embodiments, the method or composition including one or more ion-sequestering agents can protect particular polymers from negative effects of a greater variety of ions or a greater concentration of ions than other methods and compositions. By being able to retain various beneficial properties in the presence of ions, or in the presence of larger amounts of particular ions, than other methods and compositions, various embodiments can avoid the need for ion-free or ion-depleted water, or can avoid a need to add greater amounts of polymer to achieve a desired effect downhole, and can thereby be more versatile, more cost effective, or more efficient than other methods and compositions for downhole use.

Some conventional methods and compositions for treatment of a subterranean formation require the addition of a buffering agent to bring the pH above about pH 8. In some embodiments, the methods and compositions of the present invention can avoid or reduce the use of a buffering agent. In some embodiments, the ion-sequestering agent can bring the pH of the composition above pH 8 with no or with reduced use of a buffering agent.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1A:
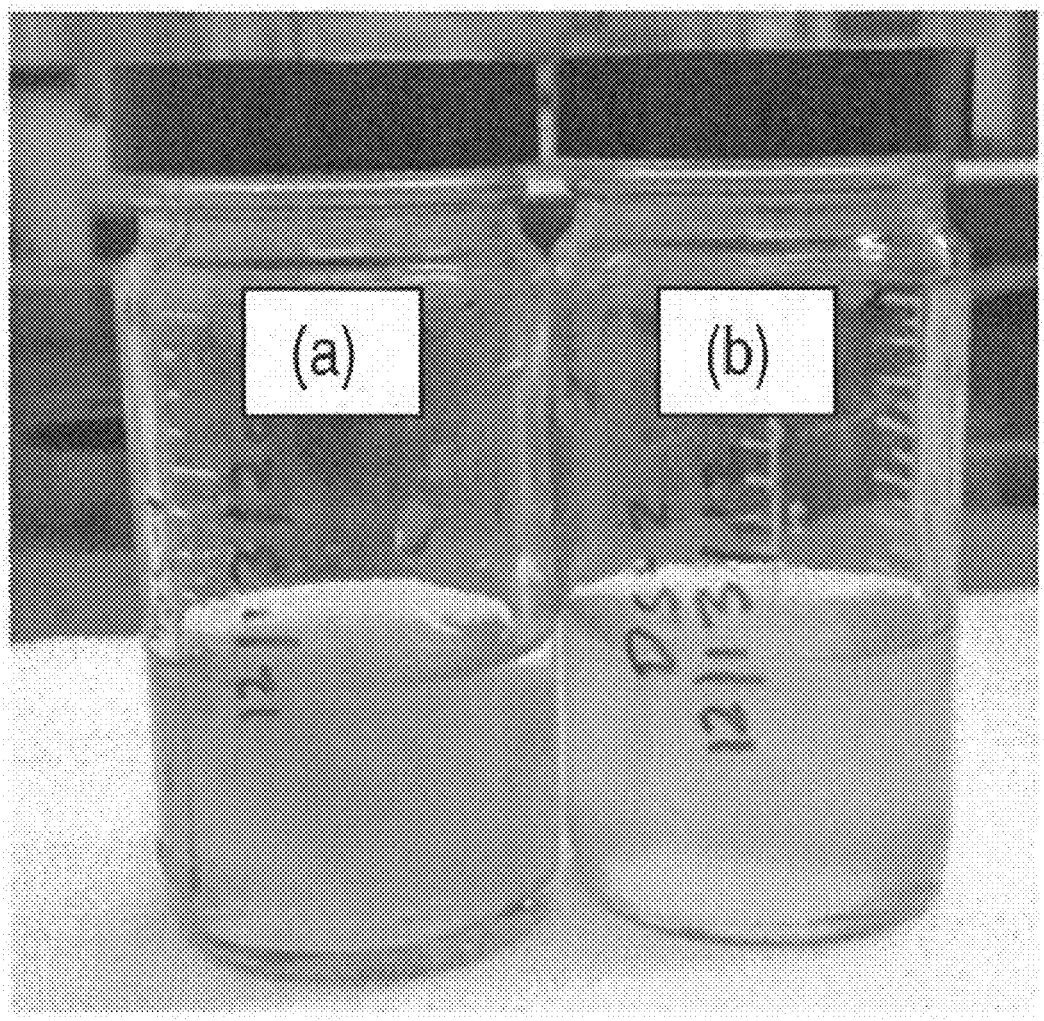
FIG. 1(A) illustrates gel sample (a), including iron ions but no sodium metasilicate, and gel sample (b), including iron ions and sodium metasilicate, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

DEFINITIONS

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

As used herein, the term "hydrocarbyl" refers to a functional group derived from a straight chain, branched, or cyclic hydrocarbon, such as an alkyl, alkenyl, alkynyl, aryl, cycloalkyl, acyl, or a combination thereof.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

The term "solvent" as used herein refers to a gas or liquid that can dissolve a solid, liquid, or gas. Nonlimiting examples of solvents are silicones, organic compounds, water, alcohols, ionic liquids, supercritical fluids, and air with petroleum vapor therein.

The term "room temperature" as used herein refers to a temperature of about 15° C. to 28° C.

As used herein, the term "polymer" refers to a molecule having at least one repeating unit, and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid, or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments, or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments downhole. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" refers to any material under the surface of the earth, including under the surface of the bottom of the ocean. For example, a subterranean material can be any section of a wellbore and any section of an underground formation in fluid contact with the wellbore, including any materials placed into the wellbore such as cement, drill shafts, liners, tubing, or screens. In some examples, a subterranean material can be any below-ground area that can produce solid (e.g. kerogen), liquid, or gaseous petroleum materials, water, or any section below-ground in fluid contact therewith.

The term "treating a subterranean formation" as used herein refers to any downhole activity relating to drilling to or extracting materials from a subterranean formation.

Treating a Subterranean Formation.

The present invention relates to methods and compositions for the treatment of subterranean formations. In various embodiments, the method can include obtaining or providing a composition including at least one-ion sequestering compound, at least one ion, and at least one polymer. The method can include sequestering the ion from the polymer with the at least one ion-sequestering compound. The method can include contacting a subterranean material downhole with the composition.

The obtaining or providing of the composition can occur in any suitable location. In some embodiments, the composition can be provided or obtained above the surface. For example, the at least one-ion sequestering compound, the at least one ion, and the at least one polymer can be combined above the surface to form the composition. In other embodiments, the composition is provided or obtained downhole. For example, the ion-sequestering compound can be added to the polymer and the ion downhole. In another example, an aqueous mixture including the ion-sequestering compound, the ion, and the polymer can be added to a downhole fluid above the surface or downhole to form the composition.

In some examples, the method includes fracturing a subterranean material downhole with the composition to form at least one subterranean fracture. The fracturing can be any suitable hydraulic fracturing. In some examples, the fracturing can include any suitable fracturing (e.g. mechanical or ultrasonic) followed by or preceded by hydraulic fracturing. The ion-sequestering compound can allow the polymer to maintain a suitable viscosity of the fracturing fluid downhole despite the presence of the ion therein.

Sequestering.

The method can include sequestering the ion from the polymer with the at least one ion-sequestering compound. The sequestering can be any suitable sequestering that can reduce or eliminate a negative effect of the ion on the polymer and the composition including the polymer, such as a negative effect on viscosity, or a negative effect on other properties of the polymer that can be related to the viscosity of the composition including the polymer, such as the degree of hydration of the polymer, the degree of crosslinking of the polymer, the gel contraction of the polymer. The mechanism by which the ion-sequestering sequesters the ion and reduces or prevents the negative effects of the ion is not limited, and can be any suitable mechanism that brings about this result. In some examples, the ion-sequestering compound can chelate, coordinate, or otherwise bind to the ion to eliminate or reduce the ability of the ion to participate in reaction pathways that can result in the degradation of the viscosity of the composition including the polymer or other properties relates thereto. In some examples, the ion-sequestering compound can physically block the ion from participating in reaction pathways that can result in the degradation of the viscosity of the composition including the polymer or other properties relates thereto. In some examples, the ion-sequestering compound can increase or maintain a distance between the ion and the polymer, such that the ion cannot interact with the polymer or such that the ion reacts less with the polymer. The sequestration can include sequestering one ion without sequestering other ions that may be present in the composition. The sequestration can include sequestering multiple ions in the solution, in different proportions or in the same proportion. The sequestration can occur quickly and effectively such that some or all of the damage the one or more ions can cause to the crosslinked polymer is reduced or substantially avoided.

In some embodiments, the sequestering agent, such as sodium silicate, can also function as a pH-modifying agent or a buffering agent. In some embodiments, the sequestering agent is sufficient, alone or in combination with other materials, to bring the composition to or to maintain the composition at any suitable pH, such as a pH of over about 8. In some embodiments, the sequestering agent is sufficient, alone or in combination with other materials, to bring the composition to or the maintain the composition at a pH of about 7.5 or less, about 8, 8.5, 9, 9.5, 10, 10.5, 11, about 11.5, or of about 12 or more.

The sequestering of the ion from the polymer can occur in any suitable location and at any suitable time. For example, the sequestering of the ion by the ion-sequestering compound can occur above the surface, downhole, or any combination thereof. In some embodiments, the sequestering of the ion by the ion-sequestering compound can occur before the contacting of the composition and the subterranean material, during or after the contacting of the composition and the subterranean material, or a combination thereof.

The sequestration can include sequestering any suitable proportion of the ion, wherein this paragraph refers to one particular type of ion in the composition (e.g. iron ions) independent of any other type of ion (e.g. bicarbonate ions) that is present in the composition. For example, the sequestering of the ion by the ion-sequestering compound can include sequestering substantially all of the ion in the composition. The sequestering of the ion by the ion-sequestering compound can include sequestering about 5 mol % to about 100% of the ion in the composition, 30 mol % to 100 mol %, or about 60 mol % to about 100 mol % of the ion in the composition, or about 5 mol % or less of the ion in the composition, or about 10 mol %, 15, 20, 25, 30, 35, 40, 45, 50, 55, 60, 65, 70, 75, 80, 85, 90, 95, 96, 97, 98, 99, or about 100 mol % of the ion in the composition.

In some embodiments, the sequestering of the ion by the ion-sequestering compound increases or maintains a degree of hydration or a hydratability of the polymer in the composition. The sequestering of the ion by the ion-sequestering compound can prevent the ion from decreasing a degree of hydration or a hydratability of the polymer in the composition. The sequestering of the ion by the ion-sequestering compound can be such that the polymer has a degree of hydration or a hydratability in the composition that is substantially the same as a degree of hydration or a hydratability of the polymer in a corresponding composition including the polymer and the ion but including less or none of the ion-sequestering compound. The sequestering of the ion by the ion-sequestering compound can be such that the polymer has a degree of hydration or a hydratability in the composition that is substantially the same as a degree of hydration or a hydratability of the polymer in a corresponding composition including the polymer but including less or none of the ion. The sequestering of the ion by the ion-sequestering compound can be such that the polymer has a degree of hydration of about 50% to about 100% of the water holding capacity of the polymer, or about 60% to 100%, or about 90% to about 100% of the water holding capacity of the polymer, or about 20% of the water holding capacity of the polymer or less, or about 25%, 30, 35, 40, 45, 50, 55, 60, 65, 70, 75, 80, 85, 90, 95, 96, 97, 98, 99, or about 100% of the water holding capacity of the polymer.

The water holding capacity of the polymer can be measured in any suitable way. In some embodiments, water holding capacity can be measured by measuring the viscosity of the composition, wherein viscosity is approximately stable at the highest hydration level. For example, the apparent viscosity of an aqueous fluid including the polymer can be measured with a FANN™ Model 50 type viscometer using an R1 rotor, B1 bob, and F1 torsion spring at a shear rate of 40 $s^{-1}$, at a temperature of 77° F. (25° C.), and at a pressure of 1 atmosphere. The polymer can be considered fully hydrated (e.g., has reached the water holding capacity) after reaching constant viscosity value, for example over a time period of about 15 minutes.

In some embodiments, the water holding capacity of the polymer can be measured by dissolving 0.5 g of the polymer in 30 mL of water, allowing to sit at room temperature for 12 h, then centrifuging. The supernatant can be drained, and the volume of water decanted can be measured to calculate the percent water retention as the water holding capacity. In some examples, the water holding capacity of various polymers measured in this fashion are: guar=100%, tragacanth=53.7%, gum arabic=7.49%, gum ghatti=44.9%.

In various embodiments, the sequestering of the ion by the ion-sequestering compound can increase or maintains a degree of crosslinking or a crosslinkability of the polymer in the composition. The sequestering of the ion by the ion-sequestering compound can prevent the ion from decreasing a degree of crosslinking or a crosslinkability of the polymer in the composition. The sequestering of the ion by the ion-sequestering compound is such that the polymer has a degree of crosslinking or a crosslinkability in the composition that is substantially the same as a degree of crosslinking or a crosslinkability of the polymer in a corresponding composition including the polymer and the ion but including less or none of the ion-sequestering compound. The sequestering of the ion by the ion-sequestering compound can be such that the polymer has a degree of crosslinking or a crosslinkability in the composition that is substantially the same as a degree of crosslinking or a crosslinkability of the polymer in a corresponding composition including the polymer but including less or none of the ion. The sequestering of the ion by the ion-sequestering compound can be sufficient such that the crosslinking reaction has gone to about 100% completion (e.g. 100 wt % of the reactants participating in crosslinking, e.g. borate, have been consumed), or about 99%, 98, 97, 96, 95, 94, 93, 92, 91, 90, 85, 80, 75, 70, 60, 50, 40, or about 30% completion or less. The sequestering of the ion by the ion-sequestering compound can be such that the gel is crosslinked to a firm gel state, e.g., wherein the gel is nonflowable and can suspend sand of suitable size.

In various embodiments, the sequestering of the ion by the ion-sequestering compound can decrease or maintain a degree of gel contraction or a gel contractability of the composition. The sequestering of the ion by the ion-sequestering compound can prevent the ion from increasing a degree of gel contraction or a gel contractability of the composition. The sequestering of the ion by the ion-sequestering compound can be such that the composition has a degree of gel contraction or a gel contractability that is substantially the same as a degree of gel contraction or a gel contractability of a corresponding composition including the polymer and the ion but including less or none of the ion-sequestering compound. The sequestering of the ion by the ion-sequestering compound can be such that the composition has a degree of gel contraction or a gel contractability that is substantially the same as a degree of gel contraction or a gel contractability of a corresponding composition including the polymer and but including less or none of the ion. The sequestering of the ion by the ion-sequestering compound can be such that the composition substantially maintains its form and shape over time, such that the gel maintains the ability to transfer force and pressure to a fracture, such as over about 1 h or less, 5 h, 24 h, 2 d, 4 d, or about 1 week or more. The sequestering of the ion by the ion-sequestering compound can be such that the composition exhibits substantially no syneresis. The sequestering of the ion by the ion-sequestering compound can be such that the composition has a degree of gel contraction, wherein 0% indicates gel with no contraction and 100% indicates a gel that is fully contracted, of about 0% to about 70%, 0% to 50%, 0% to 25%, or about 0% to about 10%, or about 0%, 1, 2, 3, 4, 5, 10, 15, 20, 25, 30, 35, 40, 45, 50, 55, 60, 65, 70, or about 75% or more. The sequestering of the ion by the ion-sequestering compound can be such that, after hydration, the gel maintains its level of hydration, for example, such that the gel loses about 0 wt % water or about 0.1 wt % water or less, or about 0.5%, 1, 2, 3, 4, 5, 6, 7, 8, 9, 10, 11, 12, 13, 14, 15, 16, 17, 18, 19, or about 20% or more water over time, such as over about 1 h or less, 5 h, 24 h, 2 d, 4 d, or about 1 week or more.

In various embodiments, the sequestering of the ion by the ion-sequestering compound can increase or maintain a viscosity of the composition. The sequestering of the ion by the ion-sequestering compound can prevent the ion from decreasing a viscosity of the composition. The sequestering of the ion by the ion-sequestering compound can be such that the composition has a viscosity that is substantially the same as a viscosity of a corresponding composition including the polymer and the ion but including less or none of the ion-sequestering compound. The sequestering of the ion by the ion-sequestering compound can be such that the composition has a viscosity that is substantially the same as a viscosity of a corresponding composition including the polymer but including less or none of the ion. The sequestering of the ion by the ion-sequestering compound can be such that the composition has a viscosity of about 0.001 cP to about 1,000,000 cP at room temperature, 0.01 cP to 100,000 cP, 0.1 cP to 10,000 cP, 1 cP to 1000 cP, or about 10 to 200 cP at about room temperature, or about 0.000,1 or less, or about 0.001 cP, 0.01, 0.1, 1, 2, 3, 4, 5, 10, 15, 20, 25, 50, 75, 100, 125, 150, 175, 200, 250, 300, 400, 500, 600, 700, 800, 900, 1000, 1500, 2000, 5000, 10,000, 50,000, 100,000, 500,000 cP, or about 1,000,000 cP or more at room temperature. In some examples, gels having viscosities too high to be effectively pumped (e.g., structurally durable gels having viscosities over 10,000 cP) can be advantageously formed downhole using suitable methods.

Sequestering Compound.

The method can include sequestering the ion from the polymer with the at least one ion-sequestering compound. The composition can include one or more than one ion-sequestering compound. The ion-sequestering compound can be any suitable sequestering compound that can reduce or eliminate the negative effect of the ion on the polymer and the composition including the polymer, such as the negative effect on viscosity. In some embodiments, the ion-sequestering compound can sequester iron ions away from the polymer. In various embodiments, the ion-sequestering compound is at least one of sodium silicate, sodium metasilicate, sodium orthosilicate, sodium pyrosilicate, a metal chelator, a sarcosinate, a detergent, a surfactant, citric acid or a salt thereof, urea monohydrochloride, an organic acid salt cleaner compound such as urea sulfate, and an organic acid or a salt thereof. The ion-sequestering compound can be any additive for a conventional detergent that allows the detergent to have uniform cleaning properties across a variety of different water sources having various ion content therein, such as those described in "How to Formulate & Compound Industrial Detergents", David G. Urban, BookSurge Publishing, February 2003.

The ion-sequestering compound can be sodium metasilicate. The sodium metasilicate can be partially or substantially fully anhydrous sodium silicate. The sodium metasilicate can have an $SiO_2$:$Na_2O$ ratio of about 1:1 to about 4:1, or about 2:1 to about 3.75:1. The sodium metasilicate can have the formula $Na_2SiO_3 \cdot nH_2O$ wherein n is about 0 to about 1000. The sodium metasilicate can have the formula —(O—Si(O$^-$Na$^+$)$_2$—)$_{DP}$—, wherein DP is about 1 to about 1000, wherein the polymer chain can be terminated in any suitable way, such as with hydroxy groups or salts thereof. In some embodiments, a 1 wt % aqueous solution of sodium metasilicate can generate a pH of about 12.7.

The ion-sequestering compound can be a metal chelator, such as any suitable metal chelator. In some embodiments, the metal chelator is suitable for chelating iron ions. In some examples, the metal chelator is an aminopolycarboxy acid, a ($C_2$-$C_{20}$)hydrocarbylene polyamine, ($C_2$-$C_{20}$)hydrocarbylene polycarboxylic acid, a ($C_2$-$C_{20}$)phosphonic acid, glutamic acid, histidine, a porpyrin, phytochelatin, DTPA (diethylenetriaminepentaacetic acid), EDTA (ethylenediamine tetraacetate), NTA (N,N-bis(carboxymethyl)glycine), Tiron (1,2-diydroxybenzene-3,5-disulfonic acid), or DTPMP (diethylenetriamine-pentamethylphosphonic acid). In other examples, metal chelators are disclosed in A. E. Martell, R. D. Hancock, "Metal Complexes in Aqueous Solutions" in Modern Inorganic Chemistry, Plenum Press, New York, N.Y., 1996, pp 58-197 and specifically at pp 151-158.

The ion-sequestering compound can have a high hard water tolerance and can include a sarcosinate, such as Hamposyl surfactants, such as an N-acyl sarcosinate.

In some embodiments, the ion-sequestering compound can be any suitable organic acid, such as a low pH organic salt used to replace traditional mineral & organic acids. In some examples the organic acid can be any organic acid, such as any $C_2$-$C_{30}$ acid, such as any compound having the structure R—C(O)OH wherein R is a $C_2$-$C_{30}$ hydrocarbyl group such as $C_2$-$C_{30}$ alkyl, $C_2$-$C_{30}$ aryl, or a group having a combination of alkyl and aryl moieties therein, wherein the $C_2$-$C_{30}$ hydrocarbyl group can be substituted or unsubstituted. In some examples, the organic acid can be at least one of acetic acid, formic acid, lactic acid, citric acid, oxalic acid, uric acid, glutaric acid, glutamic acid, adipic acid, and phthalic acid.

In some embodiments, the ion-sequestering compound can be a detergent, such as a heavy duty, low-foaming detergent, for example providing mineral and iron removal. The detergent can be a biodegradable mix of wetting agents, surfactants, emulsifiers. The detergent can be any suitable detergent. The detergent can be an anionic detergent, such as an alkylbenzenesulfonate. The detergent can be a cationic detergent, such as a detergent including an ammonium group. The detergent can be a non-ionic detergent, such as an ethoxylate, such as Tween, Triton, or Brij. The detergent can be a zwitterionic detergent.

In some embodiments, the ion-sequestering compound can be a suitable surfactant. For example, the ion-sequestering compound can be polyoxyethylene sorbitan monooleate (Tween) having a degree of polymerization of about 5 to about 100, a cetomacrogol, cetostearyl alcohol, cetyl alcohol, cocamide diethanolamine, cocamide methanolamine, decyl glucoside, octylphenoxypolyethoxyethanol having a degree of polymerization of about 5-20, octylphenoxypolyethoxyethanol, isoceteth-20, lauryl glucoside, glycerol monolaurate, a narrow range ethoxylate, octylphenoxypolyethoxyethanol having a degree of polymerization of about 5 to about 80, nonidet P-40, a nonoxynol, nonyl phenoxypolyethoxylethanol having a degree of polymerization of about 5 to 80, NP-40, octaethylene glycol monododecyl ether, octyl glucoside, oleyl alcohol, pentaethylene glycol monododecyl ether, a poloxamer, polyglycerol polyricinoleate (E476), polysorbate having a degree of polymerization of about 5 to about 100, sorbitan monostearate, sorbitan tristearate, stearyl alcohol, polyethylene glycol p-(1,1,3,3-tetramethylbutyl)-phenyl ether having a degree of polymerization of about 5 to about 20, Triton X-100, or a combination thereof with a sodium halide salt such as sodium bromide. The ion-sequestering compound can be a blend of charged species and surfactants. In some examples, the ion-sequestering compound can be polysorbate 80 (e.g., Tween 80) and sodium bromide.

The ion-sequestering compound can be present in any suitable concentration, such that the ion-sequestering compound reduces or eliminates the negative effect of the ion on the polymer and the composition including the polymer, such as the negative effect on viscosity. In some embodiments, the composition can include about 0.000,000,001 wt % to about 30 wt % of the ion-sequestering compound, 0.000,001 wt % to 20 wt % of the ion-sequestering compound, or about 0.000,1 wt % to about 10 wt % of the ion-sequestering compound, or 0.000,000,000,001 wt % or less, or about 0.000,000,000,01 wt %, 0.000,000,000,1, 0.000,000,001, 0.000,000,01, 0.000,000,1, 0.000,001, 0.000,01, 0.000,05, 0.000,1, 0.000,5, 0.001, 0.005, 0.01, 0.025, 0.05, 0.075, 0.1, 0.25, 0.5, 0.75, 1, 1.5, 2, 2.5, 3, 3.5, 4, 4.5, 5, 6, 7, 8, 9, 10, 15, 20, 25 wt %, or about 30 wt % or more of the ion-sequestering compound.

Polymer.

The method can include sequestering the ion from the polymer with the at least one ion-sequestering compound. The composition can include one or more than one polymer. The polymer can be any suitable polymer. The polymer can be a polymer that can cause the viscosity of the composition to increase relative to the viscosity of the composition not having the polymer therein or not having the crosslinked polymer therein. The polymer can be a polymer that less effectively increases the viscosity of the composition in a solution with the at least one ion if not for the presence of the ion-sequestering compound.

The method can include using the polymer to increase the viscosity of the composition, and can including changing other properties of the polymer that can be related to the viscosity of the composition including the polymer, such as the degree of hydration of the polymer, or such as the degree of crosslinking of the polymer. The polymer can be used to increase the viscosity of the composition above the surface or downhole. The polymer can be used to increase the viscosity of the composition at least one of before, during, and after addition of the ion-sequestering compound to the composition. In some embodiments, above the surface, the method can include increasing at least one of the degree of hydration of the polymer, the degree of crosslinking of the polymer, or the viscosity of the composition. In some examples, downhole, the method can include increasing at least one of the degree of hydration of the polymer, the degree of crosslinking of the polymer, or the viscosity of the composition. In some embodiments, prior to the contacting of the composition and the subterranean material, the method can include increasing at least one of the degree of hydration of the polymer, the degree of crosslinking of the polymer, or the viscosity of the composition. In some examples, at least one of during and after the contacting of the composition and the subterranean material, the method can include increasing at least one of the degree of hydration of the polymer, the degree of crosslinking of the polymer, or the viscosity of the composition. In some embodiments, above the surface, the polymer is added to an aqueous composition including the ion-sequestering compound and the ion, such that the viscosity of the aqueous composition increases prior to use downhole.

In various embodiments, the polymer can be at least one of hydratable, crosslinkable, and a drilling fluid viscosifier. For example, a hydratable polymer can include a network of hydrophilic chains that can form viscous materials having flowability in the presence of water, or can form a hydrogel in the presence of water. A crosslinkable polymer can be crosslinked, such that bonds are formed between polymer strands, optionally via a crosslinking molecule. Crosslinking can be performed using any suitable method. For example, in the case of guar gum or derivatized guar gum, boron in the form of borax or boric acid can crosslink the polymer gum with borate crosslinking moieties. Other metals suitable for crosslinking guar or derivatized guar include chromium, aluminum, antimony, zirconium, titanium, and calcium.

In some embodiments, the polymer can be a linear polysaccharide. The polymer can be poly(acrylic acid), poly (vinyl acetate), poly(vinyl alcohol), poly(ethylene glycol), poly(vinyl pyrrolidone), polyacrylamide, poly(hydroxyethyl methacrylate), cellulose, starch, tamarind, tragacanth, guar gum (e.g. guar or derivatized guar), gum ghatti, gum arabic, locust bean gum, cellulose, or a derivative thereof. The polymer can be cellulose or a cellulose derivative such as carboxymethyl cellulose, hydroxyethyl cellulose, carboxymethyl hydroxyethyl cellulose, hydroxypropyl cellulose, methyl hydroxyl ethyl cellulose. The polymer can be guar or a guar derivative, such as carboxy methyl guar, or carboxymethyl hydroxylpropyl guar. The polymer can be any suitable polysaccharide, such as acetan, alginate, cellulose, chitosan, curdlan, a cyclosophoran, dextran, diutan, emulsan, a galactoglucopolysaccharide, gellan, glucuronan, N-acetyl-glucosamine, N-acetyl-heparosan, hyaluronic acid, indican, kefiran, lentinan, levan, mauran, pullulan, scleroglucan, schizophyllan, stewartan, succinoglycan, xanthan, or welan.

The composition can include any suitable amount of the polymer. In some examples, the composition can include about 0.000,000,000,1 wt % to about 50 wt % of the polymer, about 0.000,000,1 wt % to 50 wt %, or about 0.001 wt % to about 50 wt % of the polymer, or about 0.000,000, 001 wt % or less, or about 0.000,000,01, 0.000,000,1, 0.000,001, 0.000,01, 0.000,1, 0.001, 0.005, 0.01, 0.05, 0.1, 0.5, 1, 2, 3, 4, 5, 10, 20, 30, about 40 wt %, or about 50 wt % or more of the polymer.

Ion.

The at least one ion can be sequestered from the polymer with the at least one ion-sequestering compound. The composition can include one or more than one ion. The at least one ion can be any suitable aqueous ion. The ion can originate in the water used to form the composition, for example, from sea water, from water that is naturally derived from a subterranean formation, water that is first injected to and then recovered from a subterranean formation, brackish water, lake water, or any suitable water that contains the ions. The ion can be an ion that has negative effects on the viscosity of a composition including the polymer, wherein the negative effects can occur at the time of formation of the composition or at a later time. The ion can be at least partially sequestered from the polymer by the ion-sequestering compound.

In a in a corresponding composition (e.g. a composition that is substantially the same) including the polymer and the ion but including less or none of the ion-sequestering compound, the ion at least one of decreases a degree of hydration of the polymer in the corresponding composition, decreases a hydratability of the polymer in the corresponding composition, decreases a degree of crosslinking of the polymer in the corresponding composition, decreases a crosslinkability of the polymer in the corresponding composition, increases a degree of gel contraction of the corresponding composition, increases a gel contractability of the corresponding composition, and decreases a viscosity of the corresponding composition.

The ion can be an organic ion or an inorganic ion. In some embodiments, the ion can be an anion chosen from fluoride, chloride, bromide, iodide, nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate, a conjugate base of any carboxylic acid (e.g., acetate, formate), oxide, sulfide, nitride, arsenate, phosphate, arsenite, hydrogen phosphate, sulfate, thio sulfate, sulfite, carbonate, chromate, dichromate, peroxide, and oxalate. In some embodiments, the ion can be a cation chosen from a group I element (e.g., $Na^+$, $K^+$), $Ag^+$, $NH_4^+$, $Al^{3+}$, $Ca^{2+}$, $Cu^{2+}$, $Fe^{2+}$, $Fe^{3+}$, and $Mg^{2+}$. In some examples, the ion is chosen from $Fe^{2+}$ and $Fe^{3+t}$.

The composition can include any suitable amount of the ion. In some examples, the composition includes about 0.000,000,01 wt % to about 30 wt % of the ion, 0.001 wt % to 10 wt % of the ion, or about 0.01 wt % to about 5 wt % of the ion, or 0.000,000,01, 0.000,000,1, 0.000,001, 0.000, 01, 0.000,05, 0.000,1, 0.000,5, 0.001, 0.005, 0.01, 0.05, 0.1, 0.5, 1, 2, 3, 4, 5, 6, 7, 8, 9, 10, 15, 20, 25 wt %, or about 30 wt % or more of the ion.

Downhole Mixture or Composition.

The composition including the at least one polymer, the at least one ion, and the at least one ion-sequestering compound can be combined with any suitable downhole mixture before, during, or after the contacting of the composition and the subterranean material. In some examples, the polymer, ion, and ion-sequestering compound are combined with a downhole fluid above the surface, then the combined composition is placed downhole and contacted with a subterranean material. In another example, the polymer, ion, and ion-sequestering compound injected downhole to combine with a downhole fluid, and the combined composition is contacted with a subterranean material. In various examples, at least one of prior to, during, and after the contacting of the subterranean material and the composition, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, diverting fluid, or a combination thereof In various embodiments, the method includes combining the composition including the polymer, the ion, and the ion-sequestering compound with any suitable downhole fluid, such as an aqueous or oil-based fluid including a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, diverting fluid, or a combination thereof, to form a mixture. The contacting of the subterranean material and the composition can include contacting the subterranean material and the mixture. A mixture that is contacted with the subterranean material can include any suitable weight percent of the composition including the ion, polymer, and ion-sequestering compound, such as about 0.000,000,01 wt % to 99.999,99 wt %, 0.000,1-99.9 wt %, 0.1 wt % to 99.9 wt %, or about 20-90 wt %, or about 0.000,000,01 wt % or less, or about 0.000, 001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.999,9, or about 99.999,99 wt % or more of the composition.

In some embodiments, the composition can include any suitable amount of any suitable material used in a downhole fluid. For example, the composition can include water, saline, aqueous base, oil, organic solvent, synthetic fluid oil phase, aqueous solution, alcohol or polyol, cellulose, starch, alkalinity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, dispersant, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement fly ash, metakaolin, shale, zeolite, a crystalline silica compound, amorphous silica, fibers, a hydratable clay, microspheres, pozzolan lime, or a combination thereof.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reducing friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks penetrated and also to form a thin, low permeability filter cake which temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g. barium sulfate), surfactants (e.g. betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g. silica), pigments, dyes, precipitating agents (e.g., silicates or aluminum complexes), and rheology modifiers such as thickeners or viscosifiers (e.g. xanthan gum). Any ingredient listed in this paragraph can be either present or not present in the mixture. The drilling fluid can be present in the mixture with the composition including the ion, polymer, and ion-sequestering compound in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.9999 wt % or more of the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, Composition and Properties of Drilling and Completion Fluids 66-67, 561-562 (5$^{th}$ ed. 1988). An oil-based or invert emulsion-based drilling fluid can include between about 50:50 to about 95:5 by volume of oil phase to water phase. A substantially all oil mud includes about 100% liquid phase oil by volume; e.g., substantially no internal aqueous phase.

A pill is a relatively small quantity (e.g. less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The composition including the ion, polymer, and ion-sequestering compound can form a useful combination with cement or cement kiln dust. The cement kiln dust can be any suitable cement kiln dust. Cement kiln dust can be formed during the manufacture of cement and can be partially calcined kiln feed which is removed from the gas stream and collected in a dust collector during manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with the present invention, for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, 0-95 wt %, 20-95 wt %, or about 50-90 wt %. A cement kiln dust can be present in an amount of at least about 0.01 wt %, or about 5 wt %-80 wt %, or about 10 wt % to about 50 wt %.

Optionally, other additives can be added to a cement or kiln dust-containing composition of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the present invention can include a proppant, a resin-coated proppant, an encapsulated resin, or a combination thereof. A proppant is a material that keeps an induced hydraulic fracture at least partially open during or after a fracturing treatment. Proppants can be transported downhole to the fracture using fluid, such as fracturing fluid or another fluid. A higher-viscosity fluid can more effectively transport proppants to a desired location in a fracture, especially larger proppants, by more effectively keeping proppants in a suspended state within the fluid.

The composition can include a payload material. The payload can be deposited in any suitable downhole location. The method can include using the composition to deposit a payload material into a subterranean fracture. The subterranean fracture can be any suitable subterranean fraction. In some embodiments, the method includes forming the subterranean fracture; in other embodiments, the subterranean fracture is already formed. The payload material can be a proppant, or any other suitable payload material, such as a resin-coated proppant, a curable material, an encapsulated resin, a resin, a Portland cement, a pozzolana cement, a gypsum cement, a high alumina content cement, a slag cement, a silica cement, a cementitious kiln dust, fly ash, metakaolin, shale, zeolite, a set retarding additive, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

Composition for Treatment of a Subterranean Formation.

Various embodiments provide a composition for treatment of a subterranean formation. The composition can be any suitable composition that can be used to perform an embodiment of the method for treatment of a subterranean formation described herein.

For example, the composition can include at least one polymer, at least one ion, and at least one ion-sequestering compound. The ion-sequestering compound can sequester the ion from the polymer such that the polymer can suffer less ill-effects from the presence of the ion, such as less negative effects on the ability of the polymer to provide or maintain a viscosity downhole.

In some embodiments, the composition further includes a downhole fluid. The downhole fluid can be any suitable downhole fluid. In some embodiments, the downhole fluid is a composition for fracturing or a subterranean material, or a fracturing fluid.

In some embodiments, the composition can include guar gum or a guar gum derivative, at least one $Fe^{2+}$ or $Fe^{3+}$ ion, and sodium silicate or sodium metasilicate.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including at least one polymer, at least one ion, and at least one ion-sequestering compound.

EXAMPLES

The present invention can be better understood by reference to the following examples which are offered by way of illustration. The present invention is not limited to the examples given herein.

Example 1

Guar Gum with Iron, with and without Sodium Metasilicate

Sample 1 was prepared by hydrating guar gum (25 pptg, pounds per thousand gallons) in the presence of 100 ppm iron followed by crosslinking with borate (2 gpt, gallons per thousand gallons). The pH of the gel was adjusted to about 10 by using sodium hydroxide. No effect on gel hydration was observed in presence of iron but gel syneresis (gel contraction) was noticed in 5-10 min.

Sample 2 was prepared by hydrating guar gum (25 pptg) in the presence of 100 ppm iron and 10 ppm sodium metasilicate, followed by crosslinking with borate (2 gpt). No additional buffering agent was added, the pH of the crosslinked gel was about 10. No gel syneresis was observed.

Figure 1B:
FIG. 1(B) illustrates gel sample (a), including iron ions but no sodium metasilicate.
Figure 1C:
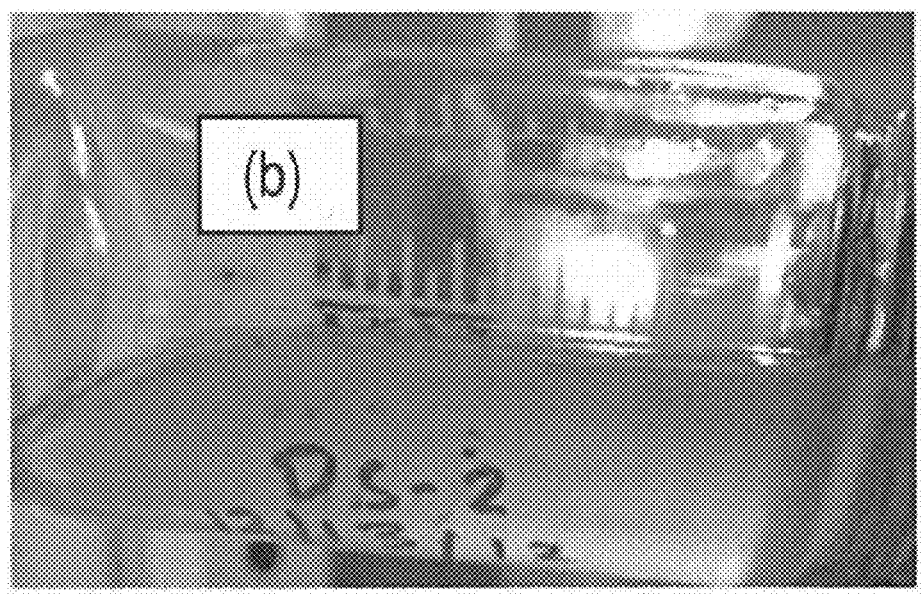
FIG. 1(C) illustrates gel sample (b), including iron ions and sodium metasilicate, in accordance with various embodiments.

FIG. 1(A)-(C) shows Samples 1 and 2. Sample 1 (DS-1, labeled "(a)") showed gel contraction when no sodium metasilicate was present whereas Sample 2 (DS-2, labeled "(b)") included sodium metasilicate and gel contraction was prevented (sample 2; DS-2).

Example 2

Guar Gum with Iron and Iodide

Figure 2A:
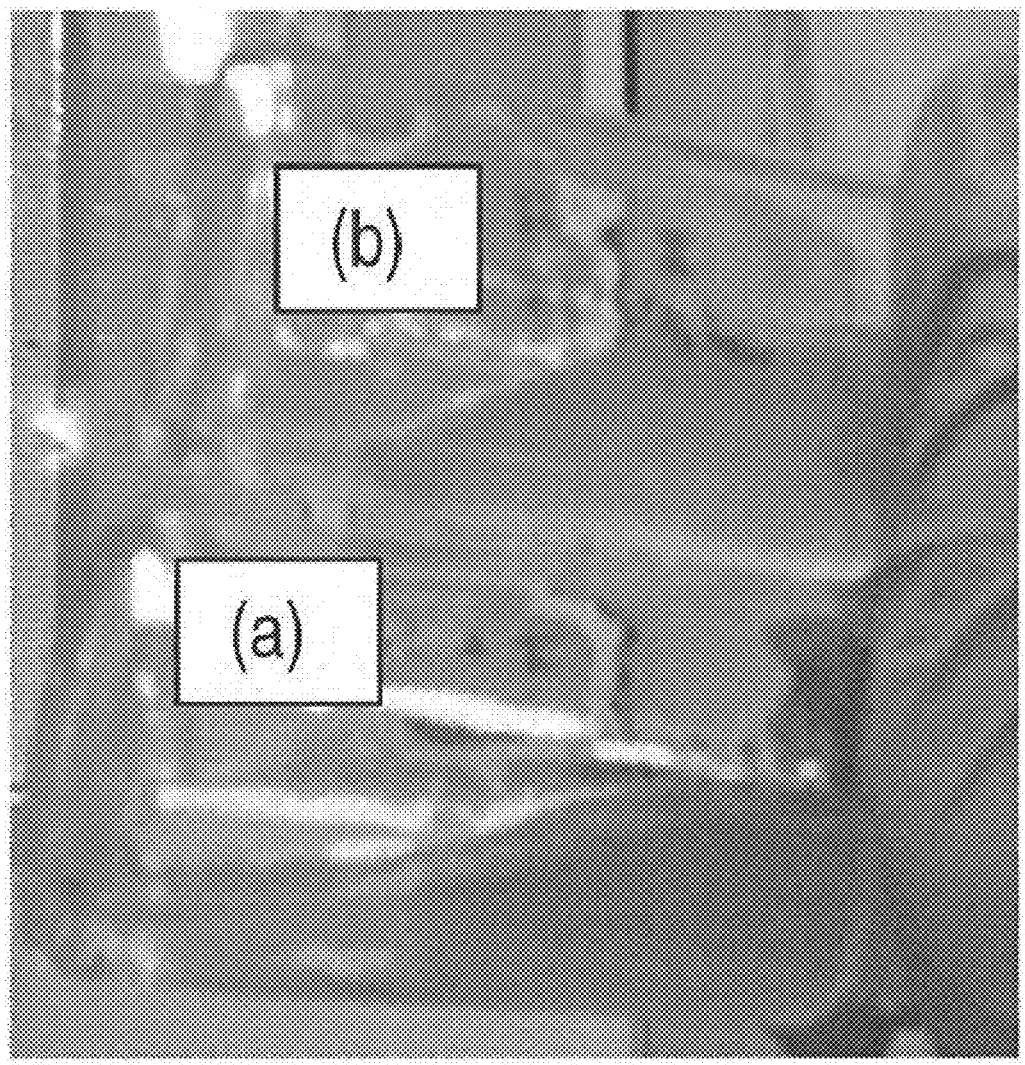
FIG. 2(A). Illustrates gel sample (a), including iron and iodide ions but no sodium metasilicate.
Figure 2B:
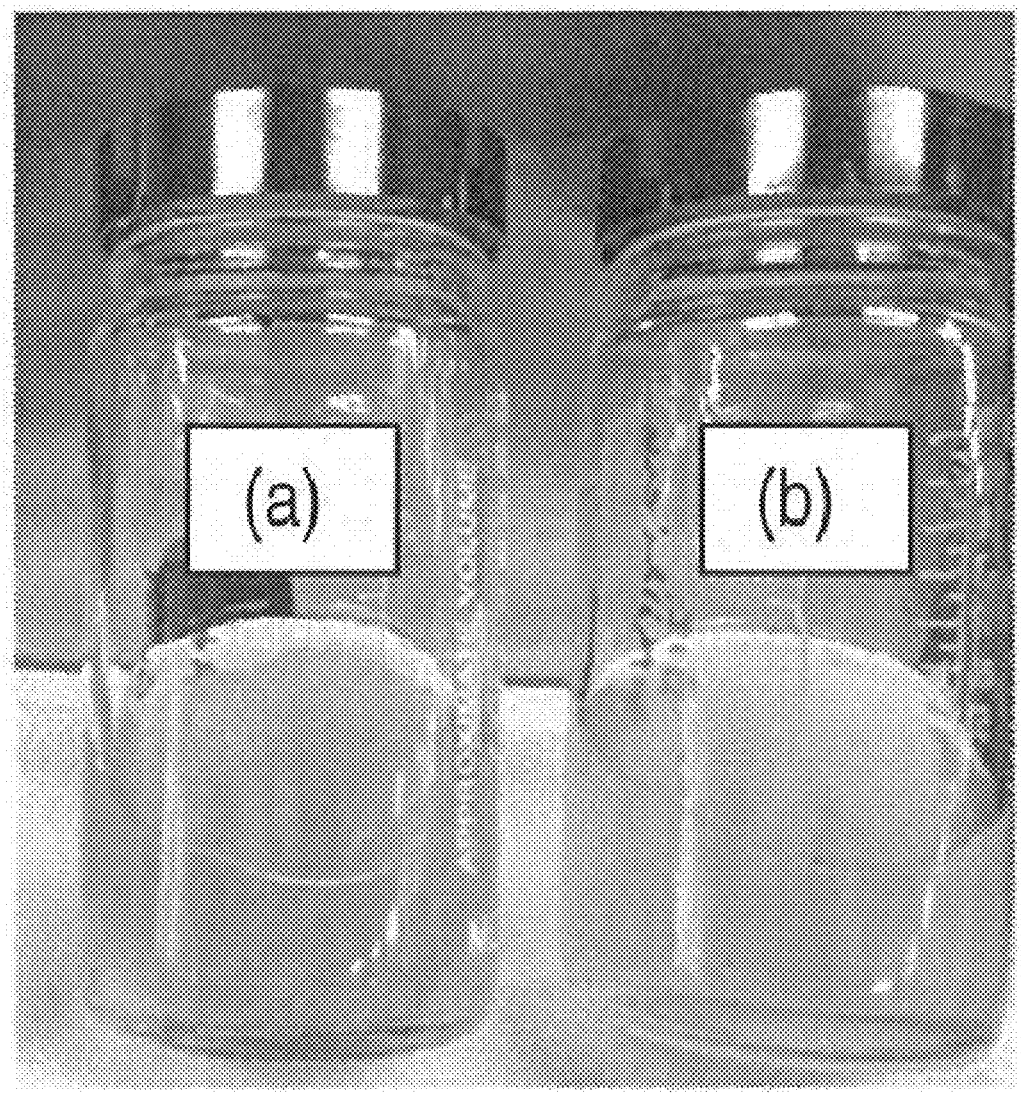
FIG. 2(B). Illustrates gel sample (b), including iron ions, iodide ions, and sodium metasilicate, in accordance with various embodiments.

A similar study was carried out using a combination of iron ions and iodide ions. The combination showed slower or no gel contraction when sodium metasilicate was present. FIG. 2 illustrates the effect of sodium metasilicate on gel contraction behaviors in presence of iron and iodide; sample (a): no metasilicate; sample (b): with metasilicate.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

Additional Embodiments

The present invention provides for the following exemplary embodiments, the numbering of which is not to be construed as designating levels of importance:

Embodiment 1 provides a method of treating a subterranean formation, the method comprising: obtaining or providing a composition comprising at least one polymer; at least one ion; and at least one ion-sequestering compound; sequestering the ion from the polymer with the ion-sequestering compound; and contacting a subterranean material downhole with the composition.

Embodiment 2 provides the method of Embodiment 1, wherein the obtaining or providing of the composition occurs above the surface.

Embodiment 3 provides the method of any one of Embodiments 1-2, wherein the obtaining or providing of the composition occurs downhole.

Embodiment 4 provides the method of any one of Embodiments 1-3, wherein the sequestering of the ion by the ion-sequestering compound occurs above the surface.

Embodiment 5 provides the method of any one of Embodiments 1-4, wherein the sequestering of the ion by the ion-sequestering compound occurs downhole.

Embodiment 6 provides the method of any one of Embodiments 1-5, wherein the sequestering of the ion by the ion-sequestering compound occurs before the contacting of the composition and the subterranean material.

Embodiment 7 provides the method of any one of Embodiments 1-6, wherein the sequestering of the ion by the ion-sequestering compound occurs at least one of during and after the contacting of the composition and the subterranean material.

Embodiment 8 provides the method of any one of Embodiments 1-7, wherein the sequestering of the ion by the ion-sequestering compound comprises sequestrating of substantially all of the ion in the composition.

Embodiment 9 provides the method of any one of Embodiments 1-8, wherein the sequestering of the ion by the ion-sequestering compound comprises sequestering about 5 mol % to about 100 mol % of the ion in the composition.

Embodiment 10 provides the method of any one of Embodiments 1-9, wherein the sequestering of the ion by the ion-sequestering compound comprises sequestering about 60 mol % to about 100 mol % of the ion in the composition.

Embodiment 11 provides the method of any one of Embodiments 1-10, wherein the sequestering of the ion from the polymer by the ion-sequestering compound comprises the ion-sequestering compound chelating the ion.

Embodiment 12 provides the method of any one of Embodiments 1-11, wherein the sequestering of the ion from the polymer by the ion-sequestering compound comprises the ion-sequestering compound decreasing the proximity of the ion from the polymer.

Embodiment 13 provides the method of any one of Embodiments 1-12, wherein the sequestering of the ion by the ion-sequestering compound increases or maintains a degree of hydration or a hydratability of the polymer in the composition.

Embodiment 14 provides the method of any one of Embodiments 1-13, wherein the sequestering of the ion by the ion-sequestering compound at least partially prevents the ion from decreasing a degree of hydration or a hydratability of the polymer in the composition.

Embodiment 15 provides the method of any one of Embodiments 1-14, wherein the sequestering of the ion by the ion-sequestering compound is such that the polymer has a degree of hydration or a hydratability in the composition that is substantially the same as a degree of hydration or a hydratability of the polymer in a corresponding composition comprising the polymer and the ion but comprising less or none of the ion-sequestering compound.

Embodiment 16 provides the method of any one of Embodiments 1-15, wherein the sequestering of the ion by the ion-sequestering compound is such that the polymer has a degree of hydration or a hydratability in the composition that is substantially the same as a degree of hydration or a hydratability of the polymer in a corresponding composition comprising the polymer but comprising less or none of the ion.

Embodiment 17 provides the method of any one of Embodiments 1-16, wherein the sequestering of the ion by the ion-sequestering compound is such that the polymer has a degree of hydration of about 50-100% of a water holding capacity of the polymer.

Embodiment 18 provides the method of any one of Embodiments 1-17, wherein the sequestering of the ion by the ion-sequestering compound is such that the polymer has a degree of hydration of about 90-100% of a water holding capacity of the polymer.

Embodiment 19 provides the method of any one of Embodiments 1-18, wherein the sequestering of the ion by the ion-sequestering compound increases or maintains a degree of crosslinking or a crosslinkability of the polymer in the composition.

Embodiment 20 provides the method of any one of Embodiments 1-19, wherein the sequestering of the ion by the ion-sequestering compound at least partially prevents the ion from decreasing a degree of crosslinking or a crosslinkability of the polymer in the composition.

Embodiment 21 provides the method of any one of Embodiments 1-20, wherein the sequestering of the ion by the ion-sequestering compound is such that the polymer has a degree of crosslinking or a crosslinkability in the composition that is substantially the same as a degree of crosslinking or a crosslinkability of the polymer in a corresponding composition comprising the polymer and the ion but comprising less or none of the ion-sequestering compound.

Embodiment 22 provides the method of any one of Embodiments 1-21, wherein the sequestering of the ion by the ion-sequestering compound is such that the polymer has a degree of crosslinking or a crosslinkability in the composition that is substantially the same as a degree of crosslinking or a crosslinkability of the polymer in a corresponding composition comprising the polymer and the ion but comprising less or none of the ion.

Embodiment 23 provides the method of any one of Embodiments 1-22, wherein the sequestering of the ion by the ion-sequestering compound decreases or maintains a degree of gel contraction or a gel contractability of the composition.

Embodiment 24 provides the method of any one of Embodiments 1-23, wherein the sequestering of the ion by the ion-sequestering compound at least partially prevents the ion from increasing a degree of gel contraction or a gel contractability of the composition.

Embodiment 25 provides the method of any one of Embodiments 1-24, wherein the sequestering of the ion by the ion-sequestering compound is such that the composition has a degree of gel contraction or a gel contractability that is substantially the same as a degree of gel contraction or a gel contractability of a corresponding composition comprising the polymer and the ion but comprising less or none of the ion-sequestering compound.

Embodiment 26 provides the method of any one of Embodiments 1-25, wherein the sequestering of the ion by the ion-sequestering compound is such that the composition has a degree of gel contraction or a gel contractability that is substantially the same as a degree of gel contraction or a gel contractability of a corresponding composition comprising the polymer and the ion but comprising less or none of the ion.

Embodiment 27 provides the method of any one of Embodiments 1-26, wherein the sequestering of the ion by the ion-sequestering compound is such that the composition has a degree of gel contraction of about 0-50%.

Embodiment 28 provides the method of any one of Embodiments 1-27, wherein the sequestering of the ion by the ion-sequestering compound is such that the composition has a degree of gel contraction of about 0-10%.

Embodiment 29 provides the method of any one of Embodiments 1-28, wherein the sequestering of the ion by the ion-sequestering compound increases or maintains a viscosity of the composition.

Embodiment 30 provides the method of any one of Embodiments 1-29, wherein the sequestering of the ion by the ion-sequestering compound at least partially prevents the ion from decreasing a viscosity of the composition.

Embodiment 31 provides the method of any one of Embodiments 1-30, wherein the sequestering of the ion by the ion-sequestering compound is such that the composition has a viscosity that is substantially the same as a viscosity of a corresponding composition comprising the polymer and the ion but comprising less or none of the ion-sequestering compound.

Embodiment 32 provides the method of any one of Embodiments 1-31, wherein the sequestering of the ion by the ion-sequestering compound is such that the composition has a viscosity that is substantially the same as a viscosity of a corresponding composition comprising the polymer but comprising less or none of the ion.

Embodiment 33 provides the method of any one of Embodiments 1-32, wherein the sequestering of the ion by the ion-sequestering compound is such that the composition has a viscosity of about 0.01 to 100,000 cP at about room temperature.

Embodiment 34 provides the method of any one of Embodiments 1-33, wherein the sequestering of the ion by the ion-sequestering compound is such that the composition has a viscosity of about 10 to 200 cP at about room temperature.

Embodiment 35 provides the method of any one of Embodiments 1-34, wherein the ion-sequestering compound comprises at least one of sodium silicate, sodium metasilicate, sodium orthosilicate, sodium pyrosilicate, a metal chelator, a sarcosinate, a detergent, a surfactant, citric acid or a salt thereof, urea monohydrochloride, urea sulfate, and an organic acid or a salt thereof.

Embodiment 36 provides the method of any one of Embodiments 1-35, wherein the ion-sequestering compound comprises sodium silicate having an $SiO_2:Na_2O$ ratio of about 1:1-4:1.

Embodiment 37 provides the method of any one of Embodiments 1-36 wherein the ion-sequestering compound comprises sodium silicate having the formula $Na_2SiO_3 \cdot nH_2O$ wherein n is about 0 to about 1000.

Embodiment 38 provides the method of any one of Embodiments 1-37, wherein the ion-sequestering compound comprises the formula $-(O-Si(O^-Na^+)_2-)_{DP}-$, wherein DP is about 1 to about 1000.

Embodiment 39 provides the method of any one of Embodiments 1-38, wherein the ion-sequestering compound comprises anhydrous sodium silicate.

Embodiment 40 provides the method of any one of Embodiments 1-39, wherein the ion-sequestering compound comprises non-anhydrous sodium silicate.

Embodiment 41 provides the method of any one of Embodiments 1-40, wherein the ion-sequestering compound comprises a metal chelator comprising an aminopolycarboxy acid, a ($C_2$-$C_{20}$)hydrocarbylene polyamine, ($C_2$-$C_{20}$) hydrocarbylene polycarboxylic acid, a ($C_2$-$C_{20}$)phosphonic acid, glutamic acid, histidine, a porpyrin, phytochelatin, DTPA (diethylenetriaminepentaacetic acid), EDTA (ethylenediamine tetraacetate), NTA (N,N-bis(carboxymethyl) glycine), Tiron (1,2-diydroxybenzene-3,5-disulfonic acid), or DTPMP (diethylenetriamine-pentamethylphosphonic acid).

Embodiment 42 provides the method of any one of Embodiments 1-41, wherein the ion-sequestering compound comprises an N-acyl sarcosinate.

Embodiment 43 provides the method of any one of Embodiments 1-42, wherein the ion-sequestering compound comprises an organic acid comprising at least one of acetic acid, formic acid, lactic acid, citric acid, oxalic acid, glutaric acid, glutamic acid, adipic acid, phthalic acid, and uric acid.

Embodiment 44 provides the method of any one of Embodiments 1-43, wherein the ion-sequestering compound comprises at least one of polyoxyethylene sorbitan monooleate (Tween) having a degree of polymerization of about 5 to about 100, a cetomacrogol, cetostearyl alcohol, cetyl alcohol, cocamide diethanolamine, cocamide methanolamine, decyl glucoside, octylphenoxypolyethoxyethanol having a degree of polymerization of about 5-20, octylphenoxypolyethoxyethanol, isoceteth-20, lauryl glucoside, glycerol monolaurate, a narrow range ethoxylate, octylphenoxypolyethoxyethanol having a degree of polymerization of about 5 to about 80, nonidet P-40, a nonoxynol, nonyl phenoxypolyethoxyethanol having a degree of polymerization of about 5 to 80, NP-40, octaethylene glycol monododecyl ether, octyl glucoside, oleyl alcohol, pentaethylene glycol monododecyl ether, a poloxamer, polyglycerol polyricinoleate (E476), polysorbate having a degree of polymerization of about 5 to about 100, sorbitan monostearate, sorbitan tristearate, stearyl alcohol, polyethylene glycol p-(1,1,3,3-tetramethylbutyl)-phenyl ether having a degree of polymerization of about 5 to about 20, Triton X-100, and a combination thereof.

Embodiment 45 provides the method of any one of Embodiments 1-44, wherein the ion-sequestering compound comprises polysorbate 80 and sodium bromide.

Embodiment 46 provides the method of any one of Embodiments 1-45, wherein the composition comprises about 0.000,000,001 wt % to about 30 wt % of the ion-sequestering compound.

Embodiment 47 provides the method of any one of Embodiments 1-46, wherein the composition comprises about 0.000,1 wt % to about 10 wt % of the ion-sequestering compound.

Embodiment 48 provides the method of any one of Embodiments 1-47, wherein the polymer is at least one of hydratable, crosslinkable, and a drilling fluid viscosifier.

Embodiment 49 provides the method of any one of Embodiments 1-48, wherein the polymer comprises a linear polysaccharide.

Embodiment 50 provides the method of any one of Embodiments 1-49, wherein the polymer comprises poly (acrylic acid), poly(vinyl acetate), poly(vinyl alcohol), poly (ethylene glycol), poly(vinyl pyrrolidone), polyacrylamide, poly(hydroxyethyl methacrylate), cellulose, starch, tamarind, tragacanth, guar gum, gum ghatti, gum arabic, locust bean gum, cellulose, or a derivative thereof Embodiment 51 provides the method of any one of Embodiments 1-50, wherein the polymer comprises carboxymethyl cellulose, hydroxyethyl cellulose, carboxymethyl hydroxyethyl cellulose, hydroxypropyl cellulose, methyl hydroxyl ethyl cellulose, carboxy methyl guar, or carboxymethyl hydroxylpropyl guar.

Embodiment 52 provides the method of any one of Embodiments 1-51, wherein the polymer comprises acetan, alginate, cellulose, chitosan, curdlan, a cyclosophoran, dextran, diutan, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, or welan.

Embodiment 53 provides the method of any one of Embodiments 1-52, wherein above the surface, at least one of a degree of hydration of the polymer is increased, degree of crosslinking of the polymer is increased, or a viscosity of the composition is increased.

Embodiment 54 provides the method of any one of Embodiments 1-53, wherein downhole, at least one of a degree of hydration of the polymer is increased, degree of crosslinking of the polymer is increased, or a viscosity of the composition is increased.

Embodiment 55 provides the method of any one of Embodiments 1-54, wherein prior to the contacting of the composition and the subterranean material, at least one of a degree of hydration of the polymer is increased, degree of crosslinking of the polymer is increased, or a viscosity of the composition is increased.

Embodiment 56 provides the method of any one of Embodiments 1-55, wherein during or after the contacting of the composition and the subterranean material, at least one of a degree of hydration of the polymer is increased, degree of crosslinking of the polymer is increased, or a viscosity of the composition is increased.

Embodiment 57 provides the method of any one of Embodiments 1-56, wherein the composition comprises about 0.000,000,1 wt % to about 50 wt % of the polymer.

Embodiment 58 provides the method of any one of Embodiments 1-57, wherein the composition comprises about 0.001 wt % to about 50 wt % of the polymer.

Embodiment 59 provides the method of any one of Embodiments 1-58, wherein in a corresponding composition comprising the polymer and the ion but comprising less or none of the ion-sequestering compound, the ion at least one of decreases a degree of hydration of the polymer in the corresponding composition, decreases a hydratability of the polymer in the corresponding composition, decreases a degree of crosslinking of the polymer in the corresponding composition, decreases a crosslinkability of the polymer in the corresponding composition, increases a degree of gel contraction of the corresponding composition, increases a gel contractability of the corresponding composition, and decreases a viscosity of the corresponding composition.

Embodiment 60 provides the method of any one of Embodiments 1-59, wherein the ion comprises an organic ion or an inorganic ion.

Embodiment 61 provides the method of any one of Embodiments 1-60, wherein the ion comprises fluoride, chloride, bromide, iodide, nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate, acetate, formate, oxide, sulfide, nitride, arsenate, phosphate, arsenite, hydrogen phosphate, sulfate, thio sulfate, sulfite, carbonate, chromate, dichromate, peroxide, or oxalate.

Embodiment 62 provides the method of any one of Embodiments 1-61, wherein the ion is a cation comprising $Na^+$, $K^+$, $Ag^+$, $NH_4^+$, $Al^{3+}$, $Ca^{2+}$, $Cu^{2+}$, $Fe^{2+}$, $Fe^{3+}$, or $Mg^{2+}$.

Embodiment 63 provides the method of any one of Embodiments 1-62, wherein the ion is a cation comprising $Fe^{2+}$ or $Fe^{3+}$.

Embodiment 64 provides the method of any one of Embodiments 1-63, wherein the composition comprises about 0.000,000,001 wt % to about 30 wt % of the ion.

Embodiment 65 provides the method of any one of Embodiments 1-64, wherein the composition comprises about 0.000,1 wt % to about 30 wt % of the ion.

Embodiment 66 provides the method of any one of Embodiments 1-65, further comprising combining the composition with an aqueous or oil-based fluid comprising a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, diverting fluid, or a combination thereof, to form a mixture, wherein the contacting of the subterranean material and the composition comprises contacting the subterranean material and the mixture.

Embodiment 67 provides the method of Embodiment 66, wherein the cementing fluid comprises Portland cement, pozzolana cement, gypsum cement, high alumina content cement, slag cement, silica cement, or a combination thereof.

Embodiment 68 provides the method of any one of Embodiments 1-67, wherein at least one of prior to, during, and after the contacting of the subterranean material and the composition, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, diverting fluid, or a combination thereof.

Embodiment 69 provides the method of any one of Embodiments 1-68, wherein the composition further comprises water, saline, aqueous base, oil, organic solvent, synthetic fluid oil phase, aqueous solution, alcohol or polyol, cellulose, starch, alkalinity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, dispersant, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement fly ash, metakaolin, shale, zeolite, a crystalline silica compound, amorphous silica, fibers, a hydratable clay, microspheres, pozzolan lime, or a combination thereof.

Embodiment 70 provides the method of any one of Embodiments 1-69, wherein the contacting of the composition and the subterranean material comprises fracturing at least part of the subterranean material to form at least one subterranean fracture.

Embodiment 71 provides the method of any one of Embodiments 1-70, wherein the composition further comprises a proppant, a resin-coated proppant, an encapsulated resin, or a combination thereof.

Embodiment 72 provides the method of any one of Embodiments 1-71, wherein the composition comprises a payload material.

Embodiment 73 provides the method of Embodiment 72, further comprising using the composition to deposit at least part of the payload material downhole.

Embodiment 74 provides the method of Embodiment 73, wherein the at least part of the payload material is deposited in a subterranean fracture.

Embodiment 75 provides the method of any one of Embodiments 72-74, wherein the payload material comprises a proppant, a resin-coated proppant, a curable material, an encapsulated resin, a resin, a Portland cement, a pozzolana cement, a gypsum cement, a high alumina content cement, a slag cement, a silica cement, a cementitous kiln dust, fly ash, metakaolin, shale, zeolite, a set retarding additive, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

Embodiment 76 provides a method of treating a subterranean formation, the method comprising: obtaining or providing a composition comprising guar gum or a guar gum derivative; at least one $Fe^{2+}$ or $Fe^{3+}$ ion; and sodium silicate or sodium metasilicate; sequestering the ion from the polymer with the ion-sequestering compound; and contacting a subterranean material downhole with the composition.

Embodiment 77 provides a method of fracturing a subterranean material, the method comprising: obtaining or providing a composition comprising guar gum or a guar gum derivative; at least one $Fe^{2+}$ or $Fe^{3+}$ ion; and sodium silicate or sodium metasilicate; sequestering the ion from the polymer with the ion-sequestering compound; and fracturing a subterranean material downhole with the composition to form at least one subterranean fracture.

Embodiment 78 provides a composition for treatment of a subterranean formation, the composition comprising: at least one polymer; at least one ion; and at least one ion-sequestering compound.

Embodiment 79 provides the composition of Embodiment 78, wherein the composition further comprises a downhole fluid.

Embodiment 80 provides the composition of any one of Embodiments 78-79, wherein the composition is a composition for fracturing of a subterranean material.

Embodiment 81 provides a composition for treatment of a subterranean formation, the composition comprising: guar gum or a guar gum derivative; at least one $Fe^{2+}$ or $Fe^{3+}$ ion; and sodium silicate or sodium metasilicate.

Embodiment 82 provides a method of preparing a composition for treatment of a subterranean formation, the method comprising: forming a composition comprising at least one polymer; at least one ion; and at least one ion-sequestering compound.

Embodiment 83 provides the apparatus or method of any one or any combination of Embodiments 1-82 optionally configured such that all elements or options recited are available to use or select from.

What is claimed is:

1. A method of treating a subterranean formation, the method comprising:
   placing in the subterranean formation a composition comprising
      at least one polymer selected from the group consisting of starch, guar gum, a guar gum derivative, gum ghatti, tamarind, tragacanth, gum arabic, locust bean gum, gellan, alginate, curdlan, diutan, gellan, kefiran, levan, pullulan, scleroglucan, schizophyllan, succinoglycan, xanthan, welan, and polyacrylamide;
      at least one ion selected from the group consisting of $Na^+$, $K^+$, $Ag^+$, $NH_4^+$, $Al^{3+}$, $Cu^{2+}$, $Fe^{2+}$, $Fe^{3+}$, $Mg^{2+}$ and a combination thereof; and
      at least one ion-sequestering compound selected from the group consisting of sodium metasilicate, sodium orthosilicate, sodium pyrosilicate, a metal chelator, a sarcosinate, a detergent, urea monochloride, urea sulfate, and an organic acid or a salt thereof, wherein the composition comprises about 0.000,000,001 wt % to about 30 wt % of the ion-sequestering compound,
   wherein the organic acid is selected from the group consisting of lactic acid, oxalic acid, glutaric acid, glutamic acid, adipic acid, phthalic acid, and uric acid,
   wherein the metal chelator is selected from the group consisting of a $(C_2-C_{20})$hydrocarbylene polyamine, a porphyrin, phytochelatin, diethylenetriaminepentaacetic acid, N,N-bis(carboxymethyl)glycine, and 1,2-dihydroxybenzene-3,5-disulfonic acid; and
   sequestering the ion from the polymer with the ion-sequestering compound.

2. The method of claim 1, wherein the sequestering of the ion by the ion-sequestering compound comprises sequestering about 5 mol % to about 100 mol % of the ion in the composition.

3. The method of claim 1, wherein the sequestering of the ion by the ion-sequestering compound is such that the polymer has at least one of a degree of hydration, a hydratability, a degree of gel contraction, a gel contractability, a degree of crosslinking, a crosslinkability, and a viscosity that is substantially the same as the corresponding one or more characteristics of the polymer in a corresponding composition comprising the polymer and the ion but comprising less or none of the ion-sequestering compound.

4. The method of claim 1, wherein the sequestering of the ion by the ion-sequestering compound is such that the polymer has at least one of a degree of hydration, a hydratability, a degree of gel contraction, a gel contractability, a degree of crosslinking, a crosslinkability, and a viscosity that is substantially the same as the corresponding one or more characteristics of the polymer in a corresponding composition comprising the polymer but comprising less or none of the ion.

5. The method of claim 1, wherein the ion-sequestering compound comprises at least one of sodium metasilicate, sodium orthosilicate, sodium pyrosilicate, a sarcosinate, urea monohydrochloride, and urea sulfate.

6. The method of claim 1, wherein the polymer is at least one of hydratable, crosslinkable, and a drilling fluid viscosifier.

7. The method of claim 1, wherein the polymer comprises a linear polysaccharide.

8. The method of claim 1, wherein at least one of a degree of hydration of the polymer is increased, degree of crosslinking of the polymer is increased, or a viscosity of the composition is increased.

9. The method of claim 1, wherein the composition comprises about 0.000,000,1 wt % to about 50 wt % of the polymer.

10. The method of claim 1, wherein in a corresponding composition comprising the polymer and the ion but comprising less or none of the ion-sequestering compound, the ion at least one of decreases a degree of hydration of the polymer in the corresponding composition, decreases a hydratability of the polymer in the corresponding composition, decreases a degree of crosslinking of the polymer in the corresponding composition, decreases a crosslinkability of the polymer in the corresponding composition, increases a degree of gel contraction of the corresponding composition, increases a gel contractability of the corresponding composition, and decreases a viscosity of the corresponding composition.

11. The method of claim 1, wherein the ion comprises fluoride, chloride, bromide, iodide, nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate, acetate, formate, oxide, sulfide, nitride, arsenate, phosphate, arsenite, hydrogen phosphate, sulfate, thiosulfate, sulfite, carbonate, chromate, dichromate, peroxide, or oxalate.

12. The method of claim 1, wherein the composition comprises about 0.000,000,001 wt % to about 30 wt % of the ion.

13. The method of claim 1, further comprising combining the composition with an aqueous or oil-based fluid comprising a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, diverting fluid, or a combination thereof, to form a mixture, wherein the placing of the composition in the subterranean formation comprises placing the mixture in the subterranean formation.

14. The method of claim 13, wherein the cementing fluid comprises Portland cement, pozzolana cement, gypsum cement, high alumina content cement, slag cement, silica cement, or a combination thereof.

15. The method of claim 1, wherein at least one of prior to, during, and after the placing of the composition in the subterranean formation, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, diverting fluid, or a combination thereof.

16. The method of claim 1, wherein the placing of the composition in the subterranean formation comprises fracturing at least part of the subterranean material to form at least one subterranean fracture.

17. The method of claim 1, wherein the composition further comprises a proppant, a resin-coated proppant, an encapsulated resin, or a combination thereof.

18. A method of treating a subterranean formation, the method comprising:
    placing in the subterranean formation a composition comprising
        at least one polymer selected from the group consisting of guar gum, a guar gum derivative, and a combination thereof,
        at least one ion selected from the group consisting of an $Fe^{2+}$ ion, an $Fe^{3+}$ ion, and a combination thereof;
        at least one ion-sequestering compound that is selected from the group consisting of sodium metasilicate, sodium orthosilicate, and sodium pyrosilicate, wherein the composition comprises about 0.000,000, 001 wt % to about 30 wt % of the ion-sequestering compound; and
    sequestering the ion from the polymer with the ion-sequestering compound.

\* \* \* \* \*